United States Patent
Bischel et al.

(10) Patent No.: US 12,187,635 B2
(45) Date of Patent: Jan. 7, 2025

(54) MINERAL FIBER COMPOSITIONS HAVING ENHANCED BIOPERSISTENT PROPERTIES AND METHODS FOR MAKING AND USING THE SAME

(71) Applicant: ARMSTRONG WORLD INDUSTRIES, INC., Lancaster, PA (US)

(72) Inventors: Marsha S. Bischel, Lancaster, PA (US); Peter J. Oleske, Lancaster, PA (US)

(73) Assignee: AWI LICENSING LLC, Wilmington, DE (US)

( * ) Notice: Subject to any disclaimer, the term of this patent is extended or adjusted under 35 U.S.C. 154(b) by 185 days.

(21) Appl. No.: 17/398,225

(22) Filed: Aug. 10, 2021

(65) Prior Publication Data

US 2022/0041494 A1 Feb. 10, 2022

Related U.S. Application Data

(60) Provisional application No. 63/063,512, filed on Aug. 10, 2020.

(51) Int. Cl.
| | |
|---|---|
| C03C 13/06 | (2006.01) |
| C03C 3/062 | (2006.01) |
| C03C 3/087 | (2006.01) |
| E04B 9/04 | (2006.01) |

(52) U.S. Cl.
CPC .............. C03C 13/06 (2013.01); C03C 3/062 (2013.01); C03C 3/087 (2013.01); E04B 9/04 (2013.01)

(58) Field of Classification Search
CPC .......... C03C 13/06; C03C 3/062; C03C 3/087
See application file for complete search history.

(56) References Cited

U.S. PATENT DOCUMENTS

| | | | |
|---|---|---|---|
| 3,928,049 A | 12/1975 | Otouma | |
| 4,363,878 A | 12/1982 | Yamamoto | |
| 6,265,335 B1 * | 7/2001 | Oleske | .................... C03C 13/06 |
| | | | 501/36 |
| 9,012,342 B2 | 4/2015 | Solvang | |
| 9,321,243 B2 | 4/2016 | Fernando | |
| 9,903,109 B2 | 2/2018 | Hernandez | |
| 2003/0130140 A1 | 7/2003 | Kusuno | |
| 2014/0147615 A1 | 5/2014 | Fernando | |
| 2014/0228195 A1 | 8/2014 | Solvang | |
| 2018/0290920 A1 | 10/2018 | Ellison | |
| 2020/0062639 A1 | 2/2020 | Demott et al. | |
| 2020/0172435 A1 | 6/2020 | Salomon et al. | |

FOREIGN PATENT DOCUMENTS

| | | | |
|---|---|---|---|
| CN | 102730976 A * | 10/2012 | |
| CN | 110777480 A * | 2/2020 | ............. C03B 37/00 |
| EP | 1038846 A1 | 9/2000 | |
| GB | 979196 A * | 1/1965 | |
| KR | 10-2012-0116235 A | 10/2012 | |
| SU | 581104 A1 * | 11/1977 | |

OTHER PUBLICATIONS

"Methods for the Determination of the Hazardous Properties for Human Health of Man Made Mineral Fibres," European Commission Joint Research Centre, EUR 18748, 1999.

* cited by examiner

*Primary Examiner* — Elizabeth A. Bolden
(74) *Attorney, Agent, or Firm* — Patrick Sheldrak; The Belles Group PC

(57) ABSTRACT

Described herein are mineral fiber compositions having enhanced characteristics, such as biopersistence and resistance to heat induced shrinkage. Also described are methods for making and using the same. Such compositions may comprise manganese oxide and aluminum oxide.

18 Claims, 6 Drawing Sheets

MINERAL FIBER COMPOSITIONS HAVING ENHANCED BIOPERSISTENT PROPERTIES AND METHODS FOR MAKING AND USING THE SAME

CROSS-REFERENCE TO RELATED APPLICATIONS

This application claims the benefit of U.S. Provisional Application No. 63/063,512, filed on Aug. 10, 2020. The disclosure of the above application is incorporated herein by reference.

BACKGROUND

Man-made mineral fibers are commonly used in a variety of applications. Commonly, they are used to make insulation products. They may also be combined with various fillers and binders to make board-like materials which can then be fashioned into ceiling and wall products used in interior spaces. These latter products typically provide thermal and acoustical insulation and may also provide limited protections from flames and smoke, as mineral fibers may be a minimally combustible material.

However, prior to using man-made fibers within commercial applications, many countries or regions require the material to pass safety analysis, thus ensuring the material does not induce ill health effects on mammals. For example, the European Union requires man-made fibers longer than 20 μm in length to exhibit a clearance of at least 50% within 40 days.

It would therefore be desirable to provide mineral fiber compositions which are capable of achieving such health and safety requirements.

BRIEF SUMMARY

This summary is intended merely to introduce a simplified summary of some aspects of one or more implementations of the present disclosure. Further areas of applicability of the present disclosure will become apparent from the detailed description provided hereinafter. This summary is not an extensive overview, nor is it intended to identify key or critical elements of the present teachings, nor to delineate the scope of the disclosure. Rather, its purpose is merely to present one or more concepts in simplified form as a prelude to the detailed description below.

Applicants have discovered that utilization of mineral fibers having certain concentrations and ratios of manganese oxide and aluminum oxide provides for beneficial in vivo health profiles. In one aspect, the health profile may be to exhibit an effective in vivo biopersistence. Thus, in one embodiment, the invention is a composition comprising mineral fibers wherein the mineral fibers comprise manganese oxide and aluminum oxide.

In at least one embodiment, the present invention is directed to a composition comprising mineral fibers wherein the mineral fibers comprise manganese oxide and aluminum oxide, and wherein the manganese oxide is present in an amount from about 7 to about 10%, based on the total weight of the mineral fiber. In certain embodiments, the aluminum oxide is present in an amount greater than about 17%, based on the total weight of the mineral fiber. In certain embodiments, the aluminum oxide is present in an amount between 17.5% to 21.0%, based on the total weight of the mineral fiber. In certain embodiments, the mineral fiber comprises $SiO_2$ present in an amount between 35.0% to 41.0%, based on the total weight of the mineral fiber. In certain embodiments, the mineral fiber comprises $Fe_2O_3T$ present in an amount between 0.20% to 2.00%, based on the total weight of the mineral fiber. In certain embodiments, the mineral fiber comprises MgO present in an amount between 5% to 9%, based on the total weight of the mineral fiber. In certain embodiments, the mineral fiber comprises CaO present in an amount between 18% to 25%, based on the total weight of the mineral fiber. In certain embodiments, the mineral fiber comprises $K_2O$ present in an amount between 1.0% to 2.0%, based on the total weight of the mineral fiber. In certain embodiments, the mineral fiber comprises about 40 wt. % of $SiO_2$ and about 18.9 wt. % of $Al_2O_3$. In certain embodiments, the mineral fiber further comprises about 8.65 wt. % of MgO. In certain embodiments, the mineral fiber further comprises about 0.49 wt. % of $Fe_2O_3T$. In certain embodiments, the mineral fiber comprises about 21 wt. % of CaO. In certain embodiments, the ratio of $(SiO_2+Al_2O_3)/MnO$ within the mineral fiber is between 7 to 8. In certain embodiments, the ratio of $(SiO_2+Al_2O_3)/(MnO+Fe_2O_3T)$ within the mineral fiber is between 6 to 8. In certain embodiments, the sum of $(Al_2O_3+CaO+MgO+K_2O+Na_2O)$ within the mineral fiber is at least 50. In certain embodiments, the ratio of $(SiO_2+MnO)/(Al_2O_3+CaO+MgO+K_2O+Na_2O)$ within the mineral fiber is less than 1. In certain embodiments, the mineral fibers comprise fibers having a diameter of less than 3 microns and are more than 20 microns in length. In certain embodiments, the mineral fibers comprise fibers having a diameter of less than 3 microns and are more than 20 microns in length and have a half-life of less than 40 days when deposited into the lung of an animal. In certain embodiments, the animal is a rat. In other embodiments, the present invention is directed to a method for making a composition described herein. In further embodiments, the present invention is directed to the use of a composition described herein.

In other embodiments, the present invention is directed to a panel comprising any of the compositions described above. In certain embodiments, the panel is a ceiling panel. In certain embodiments, the invention is directed to a ceiling system comprising the panel described herein. In certain embodiments, the system further comprises a plenum space. In certain embodiments, the invention is directed to a method for making a panel as described herein.

Further areas of applicability of the present invention will become apparent from the detailed description provided hereinafter. It should be understood that the detailed description and specific examples, while indicating the typical embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Figure 1:
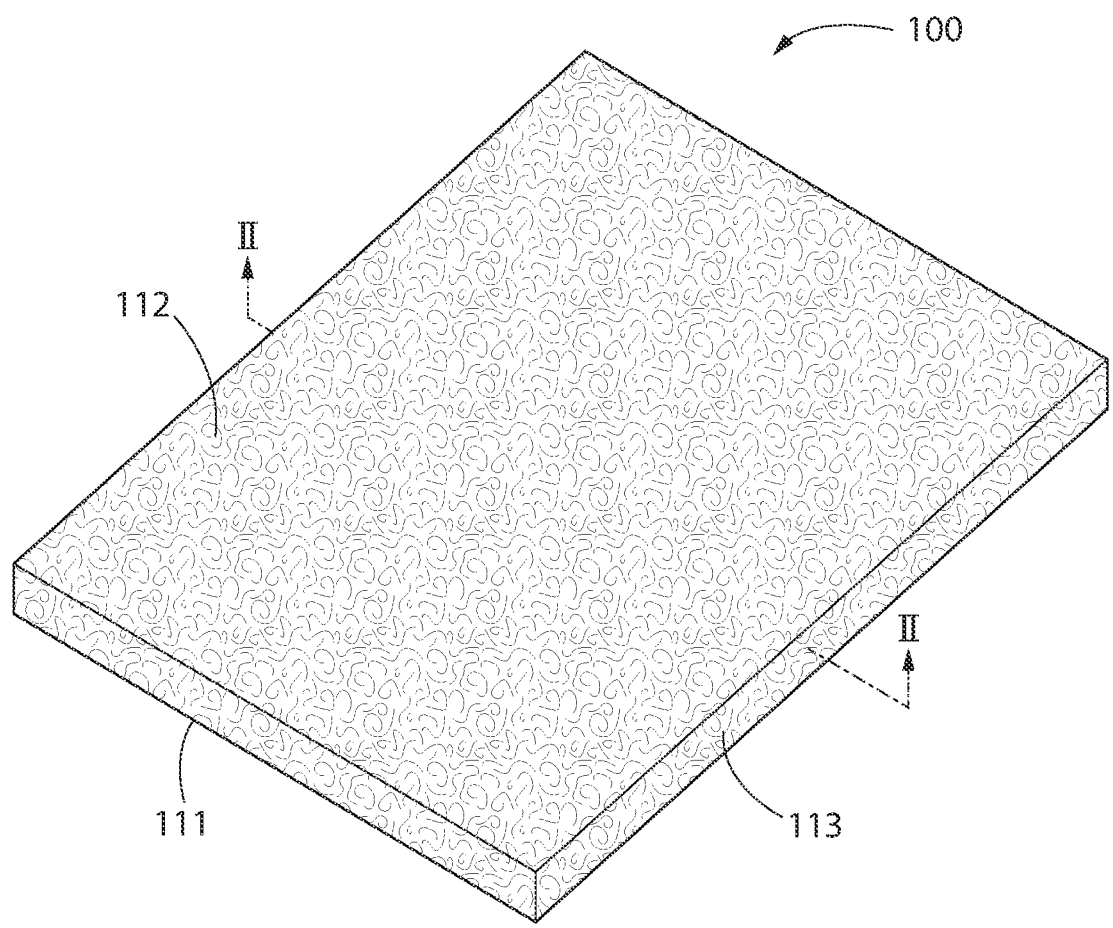
FIG. 1 is top perspective view of a building panel according to one embodiment of the present invention.

All drawings are schematic and not necessarily to scale. Parts given a reference numerical designation in one figure may be considered to be the same parts where they appear in other figures without a numerical designation for brevity unless specifically labeled with a different part number and described herein.

DETAILED DESCRIPTION

For illustrative purposes, the principles of the present invention are described by referencing various exemplary embodiments thereof. Although certain embodiments of the invention are specifically described herein, one of ordinary skill in the art will readily recognize that the same principles are equally applicable to, and can be employed in other applications and methods. It is to be understood that the invention is not limited in its application to the details of any particular embodiment shown. The terminology used herein is for the purpose of description and not to limit the invention, its application, or uses.

As used herein and in the appended claims, the singular forms "a", "an", and "the" include plural references unless the context dictates otherwise. The singular form of any class of the ingredients refers not only to one chemical species within that class, but also to a mixture of those chemical species. The terms "a" (or "an"), "one or more" and "at least one" may be used interchangeably herein. The terms "comprising", "including", "containing", and "having" may be used interchangeably. The term "include" should be interpreted as "include, but are not limited to". The term "including" should be interpreted as "including, but are not limited to".

As used throughout, ranges are used as shorthand for describing each and every value that is within the range. Any value within the range can be selected as the terminus of the range.

Unless otherwise specified, all percentages and amounts expressed herein and elsewhere in the specification should be understood to refer to percentages by weight of the total composition. Reference to a molecule, or to molecules, being present at a "wt. %" refers to the amount of that molecule, or molecules, present in the composition based on the total weight of the composition.

According to the present application, use of the term "about" in conjunction with a numeral value refers to a value that may be +/−5% of that numeral. As used herein, the term "substantially free" is intended to mean an amount less than about 5.0 weight %, less than 3.0 weight %, 1.0 wt. %; preferably less than about 0.5 wt. %, and more preferably less than about 0.25 wt. % of the composition.

As used herein, the term "biopersistent" is intended to refer to the ability of a fiber material to persist in the lung in spite of the lung's physiological clearance mechanisms and environmental conditions. A fiber material which exhibits a high biopersistence does not readily clear the tissue.

As used herein, the terms "mineral wool" or "slag wool" are used interchangeably and refer to the matted, wool-like fibrous appearance of the fibers.

Unless defined otherwise, all technical and scientific terms used herein have the same meanings as commonly understood by one of ordinary skill in the art to which this invention belongs. All patents, patent applications, publications, and other references cited or referred to herein are incorporated by reference in their entireties for all purposes. In the event of a conflict in a definition in the present disclosure and that of a cited reference, the present disclosure controls.

The present inventors have discovered that providing certain compositions comprising mineral fiber containing high levels of manganese oxide provides for materials having good structural qualities as well as beneficial biosafety characteristics. Such beneficial biosafety characteristics may be exemplified by numerous aspects. In a first aspect, the beneficial biosafety characteristic is in vivo clearance, of the fibers. In another aspect, the beneficial biosafety characteristic may be low biopersistence. Such clearance or biopersistence may be exemplified by, for example, use of animal models. In another aspect, beneficial biosafety characteristics may be shown by following toxicology protocols required by countries and/or regions. In other aspects, the compositions described herein are useful as insulation material. Insulation material may be used, for example, as a building material.

In one embodiment, the present disclosure therefore provides compositions comprising mineral fibers comprising manganese oxide. Such compositions provide for use, such as, but not exclusive to, as building materials, and also unexpectedly exhibit beneficial in vivo biopersistence profiles.

In at least one implementation, the composition comprises mineral fibers. The mineral fibers may comprise manganese oxide and aluminum oxide, wherein the manganese oxide comprises from about 7 to about 10 wt. % of the total weight of the mineral fiber.

The mineral fibers comprise manganese oxide (MnO). In certain embodiments, the manganese oxide is present in an amount from about 5 to about 15%, based on the total weight of the mineral fiber. For example, the manganese oxide may be present in an amount of about 5.0 weight %, about 5.5 weight %, about 6 weight %, about 6.5 weight %, about 7.0 weight %, about 7.5 weight %, about 8.0 weight %, about 8.5 weight %, about 9.0 weight %, about 9.5 weight %, about 10.0 weight %, about 10.5 weight %, about 11.0 weight %, about 11.5 weight %, about 12.0 weight %, about 12.5 weight %, about 13.0 weight %, about 13.5 weight %, about 14.0 weight %, or about 14.5 weight % to about 15 weight %. In another example, the manganese oxide may be present in an amount of from about 5% to about 10.0%, about 5% to about 9.5%, about 5.5% to about 9.5%, or about 6% to about 9%, based on the total weight of the mineral fiber. In another embodiment, manganese oxide may be present in an amount of from about 8.0% to about 9.0%, based on the total weight of the mineral fiber. In a further embodiment, manganese oxide may be present in an amount of from about 7.5% to about 9.5%, based on the total weight of the mineral fiber. In another embodiment, the manganese oxide may be present in an amount of from about 7.8% to about 9.3%, about 8.0% to about 9.0%, about 8.0% to about 8.6%, about 8.0% to about 8.4%, or about 8.0% to about 8.2%, based on the total weight of the mineral fiber. In a further embodiment, the manganese oxide is present in an amount of about 7.8% to about 8.6%, about 7.8% to about 8.4%, or about 8.0% to about 8.4%, based on the total weight of the mineral fiber. In a typical implementation, the mineral fiber may comprise from about 8.0 wt. % to about 8.5 wt. %, or more typically about 8.15 wt. %, of manganese oxide.

In at least one implementation, the mineral fibers comprise aluminum oxide ($Al_2O_3$). The aluminum oxide may be present at various amounts or concentrations. In one embodiment, the aluminum oxide is present in an amount greater than about 17%, based on the total weight of the mineral fiber. In another embodiment, the aluminum oxide is present in an amount greater than about 17.5%, greater than about 18.0%, greater than about 18.5%, or greater than about 19.0%, based on the total weight of the mineral fiber. In one embodiment, the aluminum oxide may be present in an amount of from about 16% to about 22%, based on based on the total weight of the mineral fiber. For example, aluminum oxide may be present in an amount of about 16.0 weight %, about 16.5 weight %, about 17.0 weight %, about 17.5 weight %, about 18.0 weight %, about 18.5 weight %, about 19.0 weight %, about 19.5 weight %, about 20.0 weight %, about 20.5 weight %, about 21.0 weight %, or about 21.5 weight % to about 22 weight %. In another example, the aluminum oxide may be present in an amount of from about 17.5% to 21.0%, from about 18.0% to about 22.0%, from about 18.0% to about 20.0%, from about 18.0% to about 19.5%, from about 18.0% to about 19.0%, or from about 18.1% to about 18.9%, based on the total weight of the mineral fiber. In another example, the aluminum oxide is present in an amount between 17.2% to 21.5%, between 17.5% to 21.0%, or between 18.0% to 19.0%, based on the total weight of the mineral fiber. In a typical implementation, the mineral fiber may comprise from about 18.0% to about 20.0% of aluminum oxide.

In at least one implementation, the mineral fibers comprise silicon dioxide ($SiO_2$). The silicon dioxide may be present at various amounts or concentrations. In one embodiment, silicon dioxide may be present in an amount of from about 35.0% to about 45.0%, based on the total weight of the mineral fiber. For example, the silicon dioxide may be present in an amount of about 35.0 weight %, about 37.0 weight %, about 39.0 weight %, about 39.5 weight %, about 40.0 weight %, about 40.5 weight %, about 41.0 weight %, about 43.0 weight %, or about 44.0 weight % to about 45 weight %. In another example, the silicon dioxide may be present in an amount of from about 35.0% to about 41.0%, about 35.5% to about 39.5%, about 35.5% to about 41.5%, about 35.5% to about 41.0%, about 35.5% to about 40.5%, or about 35.5% to about 40.0%, based on the total weight of the mineral fiber. In another embodiment, the silicon dioxide may be present in an amount of from about 37.0% to about 41.0%, from about 37.0% to about 40.5%, from about 37.0% to about 40.0%, from about 37.0% to about 39.5%, or from about 37.0% to about 39.0%, based on the total weight of the mineral fiber. In a typical implementation, the mineral fiber may comprise from about 35.0% to about 40.0% of silicon dioxide.

In certain embodiments, the mineral fibers comprise iron oxide. The term "$Fe_2O_3T$" refers to the total amount of iron oxide within the mineral fibers. One of skill in the art may recognize that the mineral fibers may contain ferric iron oxide ($Fe_2O_3$) and ferrous iron oxide (FeO). However, during analytical determinations, the ferrous iron oxide may be oxidized into ferric form. Thus, $Fe_2O_3T$ is representative of both potential species. The iron oxide may be present at various amounts or concentrations. In one embodiment, the iron oxide may be present in an amount of from about 0.20% to about 2.00%, based on the total weight of the mineral fiber. For example, the iron oxide may be present in an amount of about 0.20 weight %, about 0.25 weight %, about 0.30 weight %, about 0.40 weight %, about 0.45 weight %, about 0.47 weight %, about 0.49 weight %, about 0.50 weight %, about 0.51 weight %, about 0.60 weight %, about 0.65 weight %, about 0.70 weight %, about 0.80 weight %, about 0.90 weight %, about 1.00 weight %, about 1.20 weight %, about 1.40 weight %, about 1.60 weight %, or about 1.70 weight % to about 2.00 weight %. In another example, the iron oxide may be present in an amount of from about 0.25% to about 1.00%, 0.35% to about 0.75%, about 0.35% to about 0.65%, 0.40% to about 0.60%, or about 0.40% to about 0.50%, based on the total weight of the mineral fiber. In a typical implementation, the mineral fiber may comprise from about 0.25% to about 0.75%, or about 0.49% of iron oxide, based on the total weight of the mineral fiber.

In certain embodiments, the mineral fibers comprise magnesium oxide (MgO). The magnesium oxide may be present at various amounts or concentrations. In one embodiment, the magnesium oxide may be present in an amount of from about 4.0% to about 12.0%, based on the total weight of the mineral fiber. For example, the magnesium oxide may be present in an amount of from about 4.0 weight %, about 4.5 weight %, about 5.0 weight %, about 5.5 weight %, 6.0 weight %, about 6.2 weight %, about 6.4 weight %, about 6.6 weight %, about 6.8 weight %, about 7.0 weight %, about 7.2 weight %, about 7.6 weight %, about 7.8 weight %, about 8.0 weight %, about 8.2 weight %, about 8.4 weight %, about 8.6 weight %, or about 8.8 weight % to about 9.0 weight %. In another example, the magnesium oxide may be present in an amount of from about 6.0% to about 9.0%, 6.5% to about 9.0%, 7.0% to about 9.0%, about 8.0% to about 8.8%, or about 8.0% to about 8.7%, or about 8.0% to about 9.0%, based on the total weight of the mineral fiber. In a typical implementation, the mineral fiber may comprise from about 8.0% to about 9.0% of magnesium oxide, based on the total weight of the mineral fiber.

In certain embodiments, the mineral fibers comprise calcium oxide (CaO). The calcium oxide may be present at various amounts or concentrations. In one embodiment, the calcium oxide may be present in an amount of from about 18.0% to about 25.0%, based on the total weight of the mineral fiber. For example, the calcium oxide may be present in an amount of from about 18.0 weight %, about 18.5 weight %, about 19.0 weight %, about 19.5 weight %, 20.0 weight %, about 20.5 weight %, about 21.0 weight %, about 21.5 weight %, about 22.0 weight %, about 22.5 weight %, about 23.0 weight %, about 23.5 weight %, about 24.0 weight %, or about 24.5 weight % to about 25.0 weight %. In another example, the calcium oxide may be present in an amount of from about 18.0% to about 22.0%, 18.5% to about 21.5%, 19.0% to about 21.5%, about 19.5% to about 21.0%, or about 20.0% to about 21.0%, based on the total weight of the mineral fiber. In a typical implementation, the mineral fiber may comprise from about 20.0% to about 21.0% of calcium oxide, based on the total weight of the mineral fiber.

In certain embodiments, the mineral fiber comprises potassium oxide ($K_2O$). The potassium oxide may be present at various amounts or concentrations. In one embodiment, the potassium oxide may be present in an amount of from about 0.5% to about 2.0%, based on the total weight of the mineral fiber. For example, the potassium oxide may be present in an amount of from about 0.5 weight %, about 0.7 weight %, about 0.9 weight %, about 1.1 weight %, 1.3 weight %, about 1.5 weight %, about 1.7 weight %, or about 1.9 weight % to about 2.0 weight %. In another example, the potassium oxide may be present in an amount of from about 1.0% to about 2.0%, 1.2% to about 1.8%, 1.4% to about 1.8%, about 1.6% to about 1.8%, or about 1.6%, based on the total weight of the mineral fiber. In a typical implementation, the mineral fiber may comprise from about 1.0% to about 2.0% of potassium oxide, based on the total weight of the mineral fiber.

The mass ratio of silicon oxide, aluminum oxide and manganese oxide may vary. In certain embodiments, the ratio of $(SiO_2+Al_2O_3)/MnO$ within the mineral fiber is between 7 to 8. For example, the mineral fiber may comprise 40 wt. % of $SiO_2$, 18.95 wt. % $Al_2O_3$, and 8.15 wt. % of MnO, which yields a ratio of 7.23. In certain embodiments, the ratio of $(SiO_2+Al_2O_3)/MnO$ is from about 7.1 to about 7.9. In further embodiments, the ratio of $(SiO_2+Al_2O_3)/MnO$ is about 7.23.

The mass ratio of silicon oxide, aluminum oxide, manganese oxide and iron oxide may vary. In certain embodiments, the ratio of $(SiO_2+Al_2O_3)/(MnO+Fe_2O_3T)$ within the mineral fiber is between 6 to 8. For example, the mineral fiber may comprise 40 wt. % of $SiO_2$, 18.95 wt. % $Al_2O_3$, 8.15 wt. % of MnO, and 0.49 wt. % of $Fe_2O_3T$, which yields a ratio of 6.85. In certain embodiments, the ratio of $(SiO_2+Al_2O_3)/(MnO+Fe_2O_3T)$ is from about 6.1 to about 7.2. In further embodiments, the ratio of $(SiO_2+Al_2O_3)/(MnO+Fe_2O_3T)$ is about 6.85.

The mass of the oxides of aluminum, calcium, magnesium, potassium and sodium may vary. In certain embodiments, the sum of $(Al_2O_3+CaO+MgO+K_2O+Na_2O)$ within the mineral fiber is at least 50% of the total mass. In certain embodiments, the sum of $(Al_2O_3+CaO+MgO+K_2O+Na_2O)$ within the mineral fiber is from about 50% to about 60% of the total mass. In further embodiments, the sum of $(Al_2O_3+CaO+MgO+K_2O+Na_2O)$ within the mineral fiber is about 50.60% of the total mass.

In certain embodiments, the mineral fiber may comprise low levels of MnO. In certain embodiments, the mineral fiber may comprise the formulation described in Table 1.

TABLE 1

Composition of example mineral fibers

| Ingredient | Concentration Range (wt. %) |
| --- | --- |
| $SiO_2$ | 34.6-39.6 |
| $TiO_2$ | 0-1.6 |
| $Al2O_3$ | 15.5-18.9 |
| $Fe_2O_3T$ | 0-1.40 |
| MnO | 0.69-2.69 |
| CaO + MgO | 37.2-60 |
| $Na_2O + K_2O$ | 1-15 |
| MnO + $Fe_2O_3T$ | 0.69-4.09 |
| $SiO_2 + Al_2O_3$ | 50-58.5 |
| $(SiO_2 + Al_2O_3)/MnO$ | 21.7-72.5 |
| $(SiO_2 + Al_2O_3)/MnO + Fe_2O_3T$ | 14.3-72.5 |
| $SiO_2/(MnO + Fe_2O_3T)$ | 9.7-50.1 |
| $SiO_2$ + MnO (ST) | 35.26-42.26 |
| $Al_2O_3/MnO$ | 7-22.5 |
| $Al_2O_3/(MnO + Fe_2O_3T)$ | 4.6-22.5 |

The mineral fibers may contain fibers having various sizes. In certain embodiments, the mineral fibers comprise fibers more than 20 microns in length. In certain embodiments, the mineral fibers comprise fibers having a diameter of less than 3 microns and more than 20 microns in length.

Compositions disclosed herein may show beneficial effects within in vivo models. For example, mineral fibers of the present invention may comprise fibers having length of more than 20 microns in length and exhibit a half-life of less than 40 days when deposited into the lung of an animal. In certain embodiments, the animal may be a rat. In certain embodiments, the half-life may be about 33 days.

The compositions of the present invention may optionally comprise additional components suitable for use with mineral fiber containing compositions. Suitability of such components depends on the final application of the compositions. Examples of such components are known to persons of skill in the art. As an example, for ceiling panels, further components may include, but are not limited to, filler materials, binders, adhesive, and/or additives.

In certain embodiments, the present invention further includes a method of making any of the compositions of the present disclosure. In certain embodiments, the composition may be prepared from slag. Slag is a non-metallic vitreous material that is formed as a residual from metal extraction operations. For example, the production process of steels, iron and manganese metals are three sources of slags. Slag may be recovered from iron blast furnaces, open hearth steel furnaces, and copper, lead and precious metal smelters. Slag is generally viewed as a waste stream with little utility and is thus a commodity with relatively low value. The principal oxides of typical slags are CaO (20-50% by weight), $SiO_2$ (25-50% by weight), MgO (2-25% by weight), $Al_2O_3$ (5-20% by weight) and MnO (0.5-12% by weight). Typically, the MnO level in a steel slag is <1%. Slags with levels in excess of this are considered to be high MnO slags.

Slag has proven useful in the production of certain man-made vitreous mineral fibers, sometimes called "mineral wool" or more specifically "slag wool." These terms are used interchangeably in this application and refer to the matted, wool-like fibrous appearance of the product. Methods for making mineral fibers are known in the art. See, for example, U.S. Pat. No. 6,265,335, issued Jul. 24, 2001, which is hereby incorporated by reference in its entirety. Man-made mineral fibers may be made by melting a suitable slag-based composition to form a "melt" and then blowing or spinning the molten material with sufficient energy to cause it to be mechanically transformed into fibers. Forming a melt may typically be performed by using one of two main processes: cupola furnaces, which uses coke and oxygen as their fuel source, or electric furnaces. Once the slag is melted, the glasseous stream is conveyed to a spinning system which is used to create the fibers. These fibers can then be formed into a mat like structure, or left as slag wool, depending on the final application. The chemical composition of these fibers may be controlled by selecting and blending slags of a particular chemical make-up and/or by the use of additives (such as, but not limited to, gravel if there is a desire to raise the level of $SiO_2$, limestone if there is a desire to raise the level of CaO, or bauxite to raise the level of $Al_2O_3$) to shift the balance of oxides as well as through furnace operations.

As a non-limiting example, the mineral fiber may be produced by charging a conventional cupula with slag, gravel, bauxite and coke. The material is heated with a combination of oxygen and heated air to a temperature of between 1450 to 1480° C. The material forms a molten mass in the bottom of the cupula and may be drawn off through a side opening. The molten material is gravity-fed onto a cart-type spinning apparatus. As the molten material flows out of the cupula, material higher in the cupula moves downwardly forming additional molten material. The process may be a continuous one. Thus, as the level of the slag-based material in the cupula drops, additional slag, gravel, bauxite and coke may be added into the top of the cupula in the required percentages. The material is preferably in relatively small fist-to-thumb-sized chunks. Smaller pieces pack too closely together and retard movement of super-heated air and oxygen through the mass as necessary for even heat distribution. Larger pieces have insufficient overall surface area necessary for efficient heat transfer into the mass of the material. While it is desirable to charge the cupula with a mixture of the materials, they can also be added in layers, since the melting process tends to mix the materials. In each case, approximately 140 to 170 Kg of coke may be used per 1000 kg of meltable stone, and is added along with the other materials as the cupula is recharged. The cart-type spinning apparatus comprises a series of rapidly rotating rotors which impart centrifugal mechanical energy to the molten material sufficient to cause it to be formed into fibers as it is thrown off of the rotating surface of the rotors. This fiber-forming process is conventional in the art. The rotational speed of the rotors may range between 2900 rpm for the first rotor to 6400 for the last rotor in a four rotor system and affects the diameter of the fibers thus produced.

In other embodiments, the invention is directed to a method of forming a smelting byproduct that can be formed into a mineral fiber, the method comprising smelting a starting composition, such as an ore or slag, into a smelting byproduct and a metal. The smelting byproduct may be further processed into an inorganic fiber. The method may comprise forming a smelting byproduct that can be formed into an mineral fiber, the method comprising: a) introducing silicomanganese slag into a submerged arc furnace comprising a collection zone; b) smelting the silicomanganese slag into a silicomanganese metal and a smelting byproduct, whereby the silicomanganese metal settles to a lower portion of the collection zone and the smelting byproduct gathers in an upper portion of the collection zone due to density differential between the silicomanganese metal and the smelting byproduct; c) flowing the smelting byproduct from the collection zone from a first outlet; and d) flowing the silicomanganese metal from the collection zone from a second outlet. In further embodiments, the method may further comprise c-1) flowing the smelting byproduct from the first outlet to a fiber spinning apparatus; and c-2) processing the smelting byproduct by the fiber spinning apparatus to form the mineral fiber. In alternative embodiments, the method of forming a smelting byproduct that can be formed into an inorganic fiber, the method comprising: a) introducing silicomanganese slag into a submerged arc furnace, the submerged arc furnace comprising a collection zone having an upper portion and a lower portion, whereby the lower portion contains a first molten silicomanganese metal; b) applying power to the first molten silicomanganese metal, the first molten silicomanganese metal having a first electrical resistance, to heat the silicomanganese slag by resistance heating; c) smelting the silicomanganese slag in the heat generated in step b) to form a second molten silicomanganese metal and a smelting byproduct, whereby the second molten silicomanganese metal settles to the lower portion of the collection zone and the smelting byproduct gathers in the upper portion of the collection zone due to density differential between the second molten silicomanganese metal and the smelting byproduct; and d) flowing the smelting byproduct from the collection zone from a first outlet. In further embodiments, the method of forming a smelting byproduct that can be formed into an inorganic fiber, the method comprises: a) introducing a slag into a submerged arc furnace comprising a collection zone having an upper portion and a lower portion, whereby the lower portion contains a first molten metal; b) applying power to the first molten metal, the first molten metal having a first electrical resistance, to heat the slag by resistance heating; c) smelting the slag into a second molten metal and a smelting byproduct, whereby the second molten metal settles to the lower portion of the collection zone and the smelting byproduct gathers in the upper portion of the collection zone due to density differential between the second molten metal and the smelting byproduct; d) flowing the smelting byproduct from the collection zone from a first outlet; and e) flowing the second molten metal from the collection zone from a second outlet.

In another aspect, the present disclosure provides a method for making a panel. Standard methods may be used. For example, air-laid processing may be utilized, which is a method or manufacturing process in which the individual ingredients are suspended in an air or other gaseous stream and that preferably form a web, mat or batte on a porous wire web or other porous carrier surface. In some embodiments, the panel may be prepared by direct-lay or other methods known in the art for preparing panels. In some embodiments, the panel may be formed via a conventional wet-felting process and then optionally sanded to have a thickness in the range of about one-half inch (12.7 mm) to about 1 inch (25.4 mm). Specifically, in some embodiments, the panel may be prepared by mixing together the aforementioned components with an amount of water necessary to provide slurry consistency in conventional mixing and holding equipment. In some embodiments, the components may be mixed together using a high-shear mixer. High mixing speeds may be used to create the high-shear conditions that degrade non-woven fabric to a large degree by separation of the individual fibers. In other embodiments, the high shear mixing degrades mineral fiber by breaking it down into shorter fibers even when no or few nodules are present, resulting in a smooth surface being formed.

In another aspect, the present disclosure provides a method for using a composition as described herein as a building material. In certain embodiments, the mineral fibers are part of a panel. In other words, the panel comprises the mineral fibers described herein. The panel may be a ceiling panel. The ceiling panel may be part of a ceiling system.

Compositions disclosed herein are useful for industrial applications. In some embodiments, present invention has application to building products including building panels comprising, for example, ceiling tiles that can be incorporated into structures such as commercial buildings and home residences. In some embodiments, the composition is used to make a panel. In certain embodiments, the panel is a ceiling panel. In certain embodiments, the ceiling panel may be part of a ceiling system. In some embodiments, the ceiling panel may have multiple layers. In some embodiments, the layers may include a substrate, a veil, and a coating. In some embodiments, the layers may include a substrate, an adhesive layer, a veil, and a coating.

Referring to FIG. 1, the panel 100, an embodiment of the present invention, may comprise a first major surface 111 opposite a second major surface 112. The panel 100 may further comprise a side surface 113 that extends between the first major surface 111 and the second major surface 112, thereby defining a perimeter of the panel 100. In certain embodiments, the panel 100 is a building panel. In certain embodiments, the panel 100 is a ceiling panel.

Figure 2:
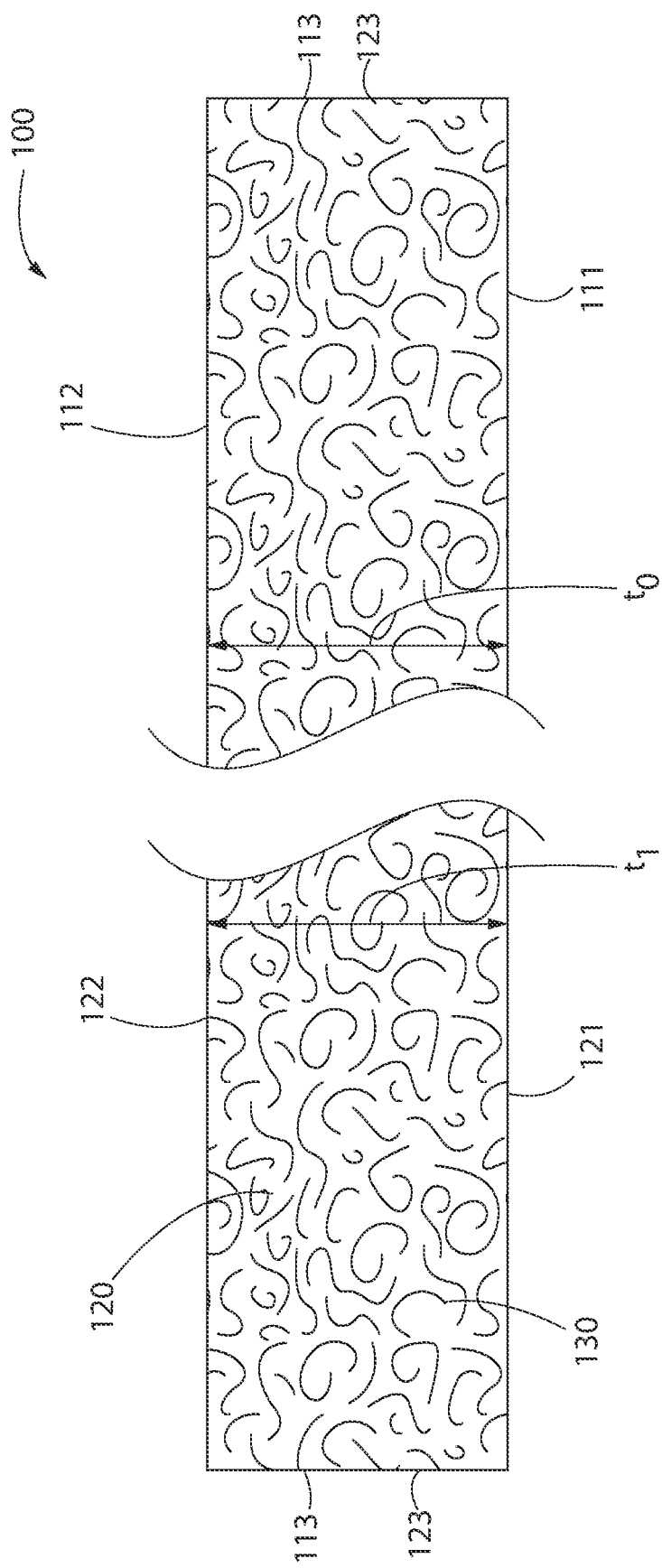
FIG. 2 is a cross-sectional view of a building panel according to one embodiment of the present invention, the cross-sectional view being along the II line set forth in FIG. 1.

Referring now to FIGS. 1 and 2, the panel 100 may have a panel thickness to as measured from the first major surface 111 to the second major surface 112. The panel thickness to may range from about 12 mm to about 40 mm—including all values and sub-ranges there-between. The panel 100 may have a length ranging from about 30 cm to about 310 cm—including all values and sub-ranges there-between. The panel 100 may have a width ranging from about 10 cm to about 125 cm—including all values and sub-ranges there-between.

The panel 100 may comprise a body 120 having an upper surface 122 opposite a lower surface 121 and a body side surface 123 that extends between the upper surface 122 and the lower surface 121, thereby defining a perimeter of the body 120. The body 120 may have a body thickness $t_1$ that extends from the upper surface 122 to the lower surface 121. The body thickness $t_1$ may range from about 12 mm to about 40 mm—including all values and sub-ranges there-between.

The first major surface 111 of the panel 100 may comprise the lower surface 121 of the body 120. The second major surface 112 of the panel 100 may comprise the upper surface 122 of the body 120. When the first major surface 111 of the panel 100 comprises the lower surface 121 of the body 120 and the second major surface 112 of the panel 100 comprises the upper surface 122 of the body 120, the panel thickness to is substantially equal to the body thickness $t_1$.

The body 120 may be porous, thereby allowing airflow through the body 120 between the upper surface 122 and the lower surface 121—as discussed further herein. The body 120 may be comprised of a binder and mineral fibers 130. In some embodiments, the body 120 may further comprise a filler and/or additive. In certain embodiments, the body 120 may be treated with a hydrophobic component thereby rending the body 120 stain-repellant.

Figure 3:
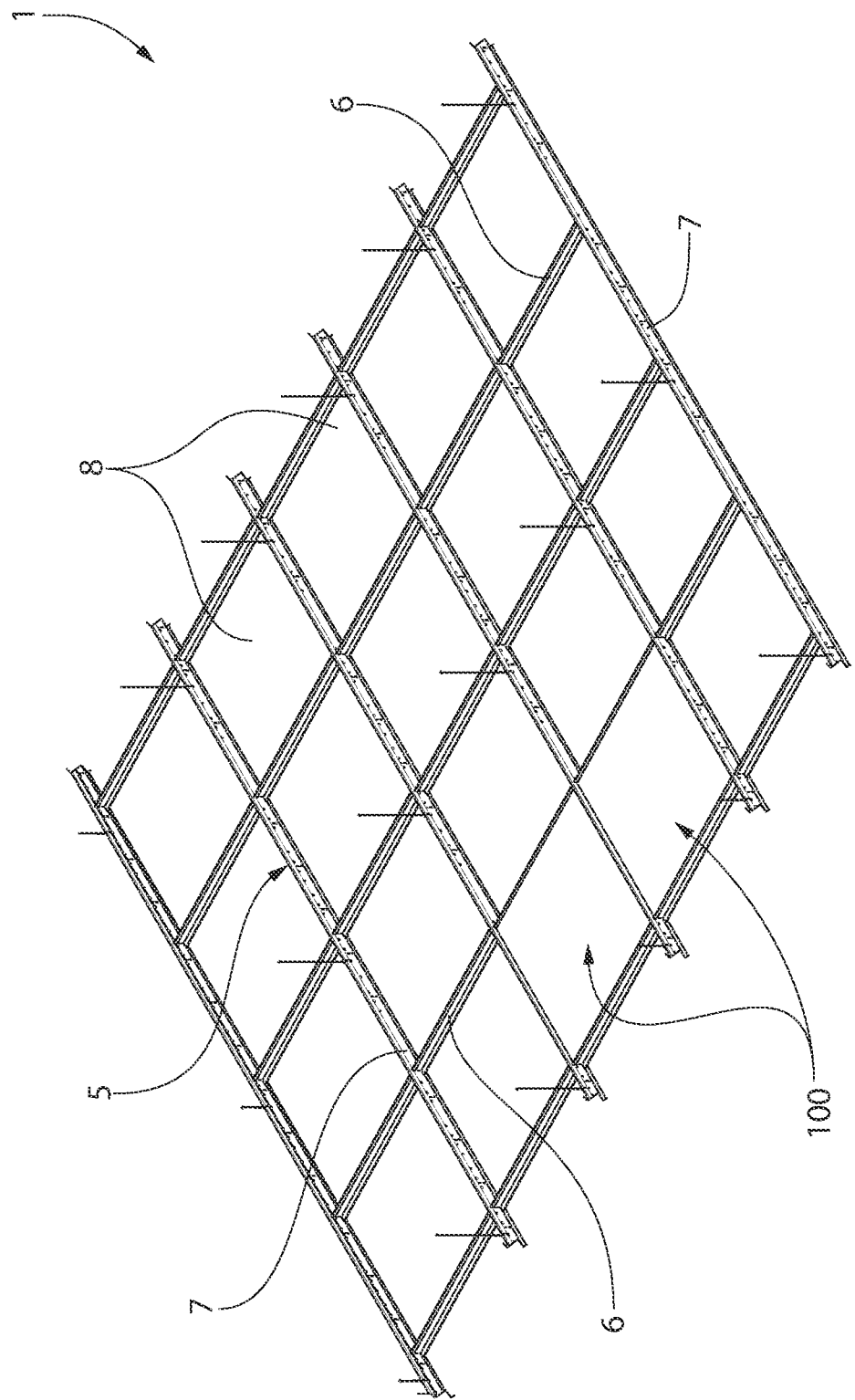
FIG. 3 is a perspective view of a ceiling system according to the present disclosure.

Referring to FIG. 3, the ceiling system 1 of the present disclosure may comprise at least one panel 100 that is mounted to the ceiling grid 5 within one of the plurality of grid openings 8. In certain embodiments, the ceiling system 1 may comprise a plurality of panels 100 mounted to the ceiling grid 5, each of the plurality of panels 100 resting within one of the plurality of grid openings 8. In some embodiments, something other than the panel 100 (for example, light fixture or an air duct vent) may be mounted to the ceiling grid 5 within at least one of the grid openings 8 (not pictured).

The ceiling grid 5 may comprise a plurality of first members 6 extending parallel to each other. In some embodiments, the ceiling grid 5 may further comprise a plurality of second members 7 that extend parallel to each other. The plurality of first members 6 may intersect the plurality of second members 7 to form a grid pattern having a plurality of grid openings 8. In some embodiments, the plurality of first members 6 intersects the plurality of second members 7 at a substantially perpendicular angle, thereby forming rectangular grid openings 8. The rectangular grid openings 8 may be square or any other shape that is aesthetical or functional.

Figure 4:
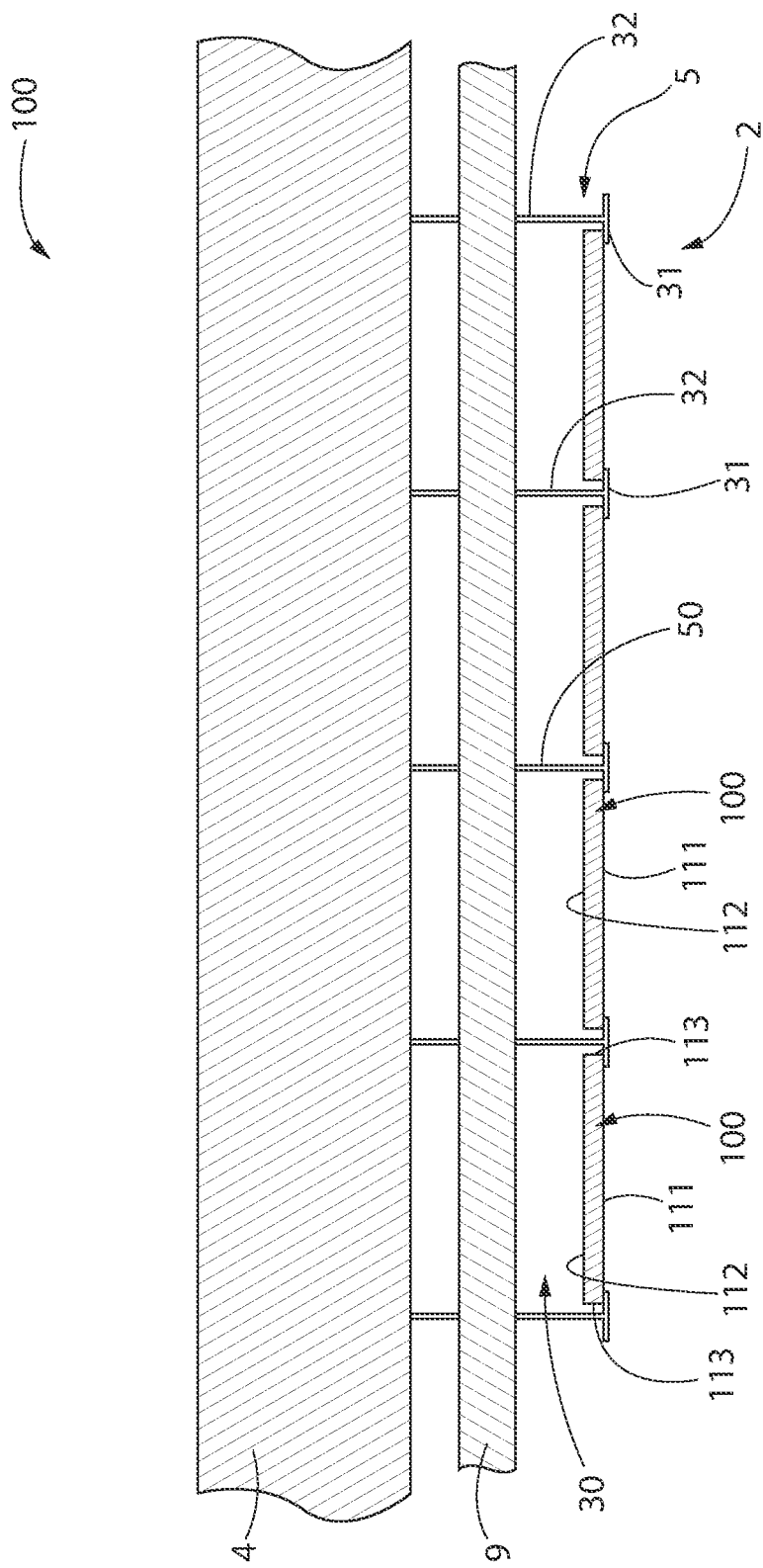
FIG. 4 is a ceiling system comprising the building panel according to one embodiment of the present invention.

Referring to FIG. 4, the present invention may further include a ceiling system 1 comprising one or more of the panels 100 installed in an interior space, whereby the interior space comprises a plenum space 30 and an active room environment 2. The plenum space 3 provides space for mechanical lines 9 within a building (e.g., HVAC, plumbing, etc.). The active space 2 provides room for the building occupants during normal intended use of the building (e.g., in an office building, the active space would be occupied by offices containing computers, lamps, etc.).

In the installed state, the panels 100 may be supported in the interior space by one or more parallel support struts 50. Each of the support struts 50 may comprise an inverted T-bar having a horizontal flange 31 and a vertical web 32. The ceiling system 1 may further comprise a plurality of first struts that are substantially parallel to each other and a plurality of second struts that are substantially perpendicular to the first struts (not pictured). In some embodiments, the plurality of second struts intersects the plurality of first struts to create an intersecting ceiling support grid 5. The plenum space 30 exists above the ceiling support grid and the active room environment 2 exists below the ceiling support grid 5. In the installed state, the first major surface 111 of the panel 100 faces the active room environment 2 and the second major surface 112 of the building panel 100 faces the plenum space 30.

The ceiling system 1 of the present invention may include the ceiling support grid 5 and at least one panel 100 supported by the ceiling support grid 6, the building panel 100 having the first major surface 111 opposite the second major surface 112, and the second major surface 112 facing upward and the first major surface 111 facing downward.

Figure 5:
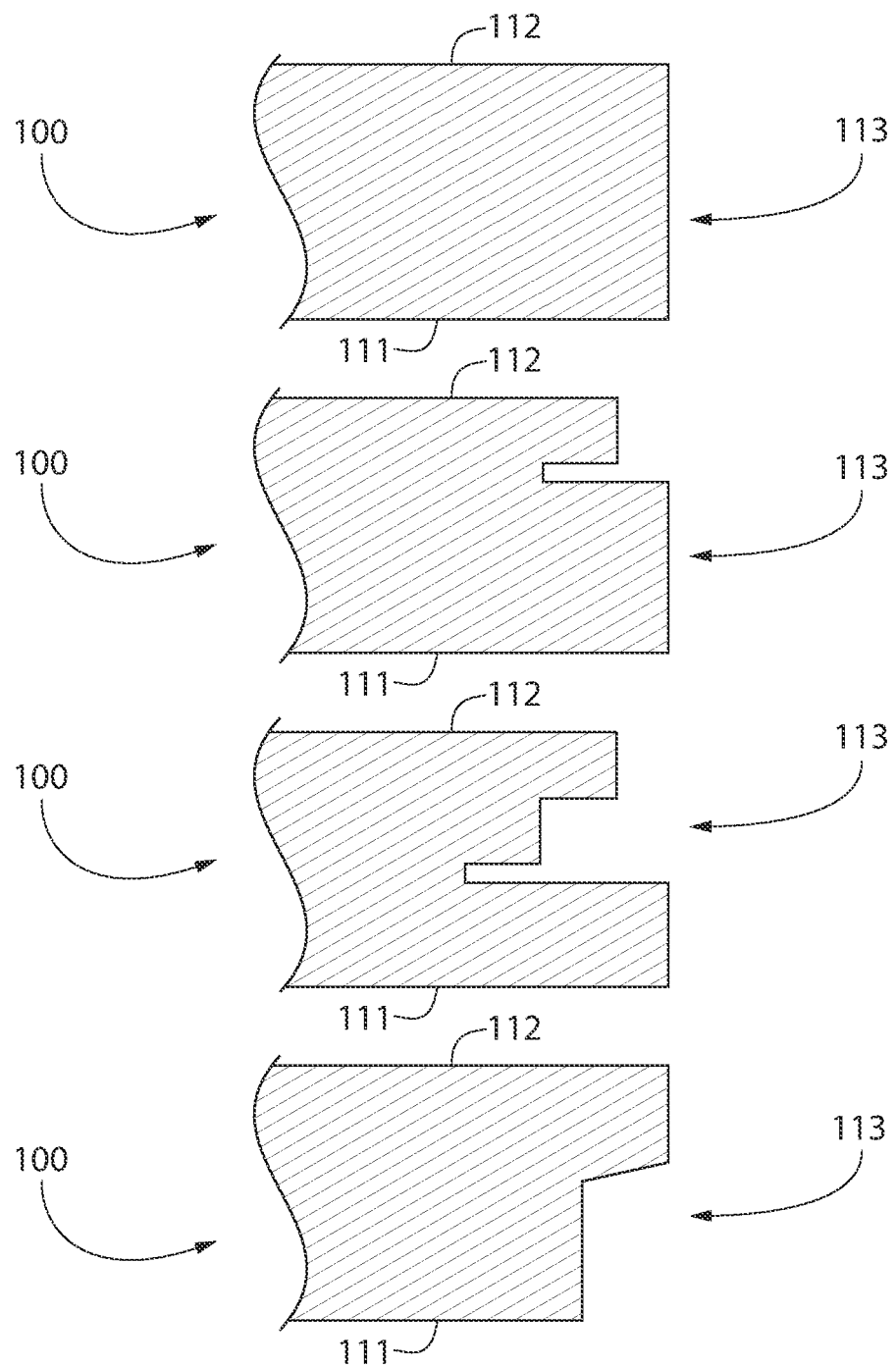
FIG. 5 is a cross-sectional close-up view of the edges of the building panels according to one embodiment the present invention.

Referring to FIG. 5, panel 100 of the present invention may comprise a first major surface 111 opposite a second major surface 112. The ceiling panel 100 may further comprise a side surface 113 that extends between the first major surface 111 and the second major surface 112, thereby defining a perimeter of the ceiling panel 100. As shown in FIG. 5, the side surface 113 may take the form of any one of a multitude of shapes.

The visual surface of the panel may include a scrim which is fixed to the panel. Any scrim may be used. Suitable scrims include, but are not limited to, scrims made of cellulose, polypropylene, polyethylene, glass, polyester, polyamide, and mixtures thereof.

Figure 6:
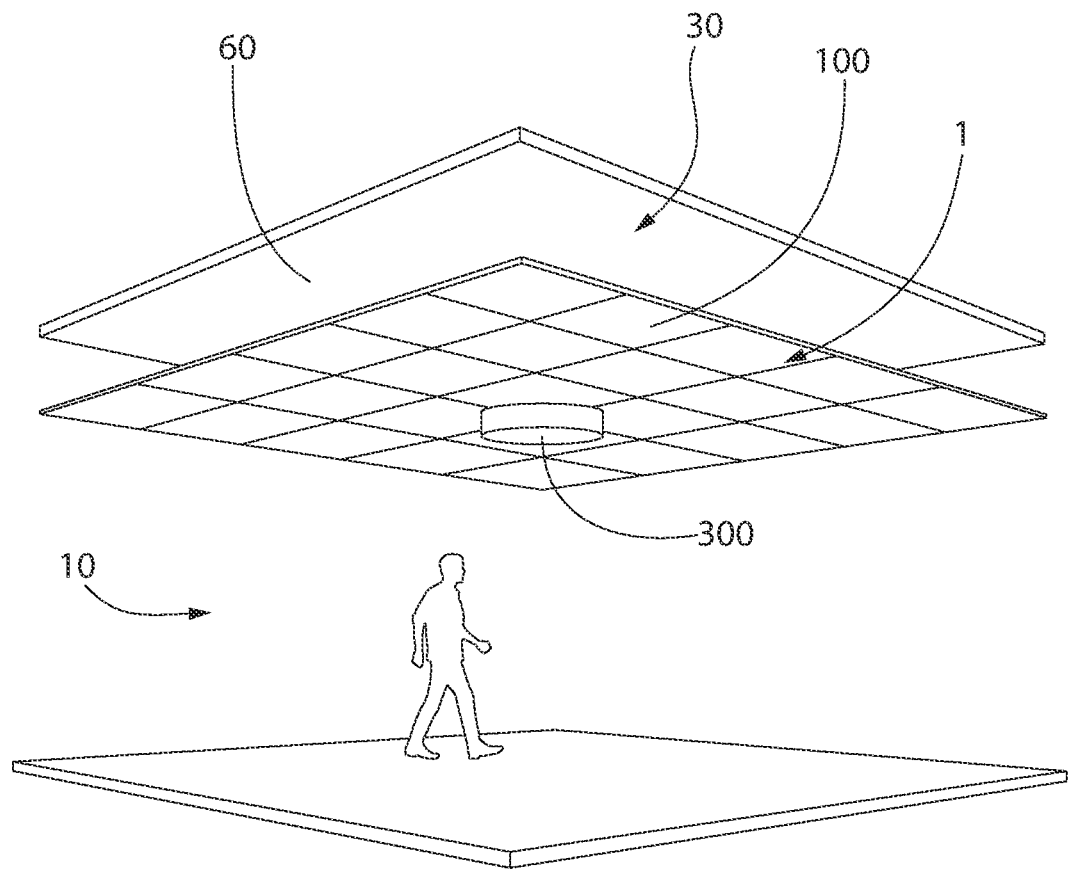
FIG. 6 is a perspective view of a ceiling system according to one embodiment.

In certain embodiments, a panel can be part of a building system such as a ceiling or wall. In particular embodiments, the building panel is part of a ceiling system which separates an occupied space from a plenum space. The occupied space is space below the ceiling system such as office space or the like. The plenum space is space above the ceiling system in which mechanical, electrical and other building systems and equipment can be housed. In some situations, the plenum space is simply an open space above the ceiling system and below the upper structure of the building space. FIG. 6 shows an example of a ceiling system 1 that separates a building space into an occupied space 10 and a plenum space 30. Plenum space 30 is above ceiling system 1 and below structural slab 60. Ceiling system 1 has a plurality of ceiling panels 100 that, in this example, are acoustic ceiling panels. An air moving system 300 is shown in this example as integrated into a group of four ceiling panels 100.

Compositions of the invention have beneficial biosafety characteristics. For example, the compositions may have a half-life of less than 40 days when deposited into the lung of an animal. In some embodiments, the mineral fibers comprise fibers having a diameter of less than 3 microns and are more than 20 microns in length and have a half-life of less than about 40 days when deposited into the lung of an animal. In some embodiments, the animal is a rat.

Compositions of the invention have beneficial shrinkage at high temperatures. In some embodiments, the composition shrinks from about −0.1% to about −0.9% at about 750° C. In other embodiments, the composition shrinks no more than −0.1% at about 750° C. In further embodiments, wherein the composition shrinks from about −3.5% to about −4.3% at about 850° C. In some embodiments, the composition shrinks no more than about −3.5% at about 850° C.

EXAMPLES

The examples and other implementations described herein are exemplary and not intended to be limiting in describing the full scope of compositions and methods of this disclosure. Equivalent changes, modifications and variations of specific implementations, materials, compositions and methods may be made within the scope of the present disclosure, with substantially similar results.

Example 1

Fibers made of various compositions were prepared and are shown in Table 2.

TABLE 2

Compositions of example mineral fibers, as measured using X-ray fluorescence

| Ingredient | Composition 1 | Composition 2 | Composition 3 |
|---|---|---|---|
| $SiO_2$ | 41.5 | 40 | 37.07 |
| $TiO_2$ | 0.2 | 0.24 | 0.56 |
| $Al_2O_3$ | 17 | 18.92 | 17.21 |
| $Fe_2O_3T$ | Not detected | 0.49 | 0.40 |
| MnO | 8.6 | 8.15 | 1.69 |
| MgO | 7.2 | 8.65 | 4.03 |
| CaO | 22.7 | 20.97 | 35.13 |
| $Na_2O$ | 0.4 | 0.41 | 0.27 |
| $K_2O$ | 1.6 | 1.65 | 1.76 |
| CaO + MgO (B) | 29.9 | 29.62 | 39.16 |
| $Na_2O + K_2O$ | 2 | 2.06 | 2.03 |
| $MnO + Fe_2O_3T$ | 8.6 | 8.6 | 2.09 |
| $SiO_2/Al_2O_3$ | 2.44 | 2.11 | 2.15 |
| $Al_2O_3/MnO$ | 1.98 | 2.32 | 10.18 |
| $SiO_2 + Al_2O_3$ (A) | 58.50 | 58.92 | 54.28 |
| A:B | 1.96 | 1.99 | 1.39 |
| $Al_2O_3/(SiO_2 + Al_2O_3)$ | 0.291 | 0.321 | 0.317 |
| $(SiO_2 + Al_2O_3)/MnO$ | 6.80 | 7.23 | 32.11 |
| $(SiO_2 + Al_2O_3)/(MnO + Fe_2O_3T)$ | 6.80 | 6.85 | 25.97 |
| $SiO_2/(MnO + Fe_2O_3T)$ | 4.83 | 4.65 | 17.73 |
| $Al_2O_3/(MnO + Fe_2O_3T)$ | 1.98 | 2.20 | 8.23 |
| $SiO_2 + MnO$ (ST) | 50.10 | 48.15 | 38.76 |
| $(SiO_2 + MnO)/Al_2O_3$ | 2.95 | 2.54 | 2.25 |
| $(Al_2O_3 + CaO + MgO + K_2O + Na_2O)$ (DI) | 48.9 | 50.6 | 58.40 |
| $(SiO_2 + MnO)/(Al_2O_3 + CaO + MgO + K_2O + Na_2O)$ | 1.02 | 0.95 | 0.66 |

Example 2

In-vivo pulmonary biopersistence testing of instilled fibers in rats was made. Methods were followed according to protocols published by the European Commission's science and knowledge service providing Scientific and Technical Research Reports, EUR 18748 EN, published in 1999, which is hereby incorporated by reference in its entirety. The analysis evaluates the pulmonary biopersistence of fibers as a function of fiber length. Briefly, rats were exposed to fibers by intratracheal instillation applied once each day for 4 consecutive days. Following the installation period, animals were examined at pre-determined intervals to determine the lung burden. The time for removing 50% of the fibers which were longer than 20 μm, or in vivo half-life of the fibers, was then determined.

TABLE 3

Results of Biopersistence Analysis

| Sample | Half-life (days) |
|---|---|
| Composition 1 | 49 |
| Composition 2 | 33 |
| Composition 3 | 21 |

Table 3 shows the determined half-life of fibers in rat lung. Surprisingly and unexpectedly, Composition 2 exhibited a much shorter half-life as compared to Composition 1. Significantly, European Union regulations require that such fibers have a half-life or 40 days or less. Therefore, Compositions 2 and 3 satisfy the regulatory requirements of the European Union.

Example 3

Fibers made of various compositions of raw material sources were prepared as shown in Table 4. Molecular components are presented as a wt. % of total. The compositions from Table 4 were tested for physical characterization and fire performance, the results are reported in Table 5.

TABLE 4

Compositions of example mineral fibers.

| Sample | General Classification | MnO | Fe2O3T | $Al_2O_3$ | $SiO_2$ | MgO | CaO | $K_2O$ | $Na_2O$ |
|---|---|---|---|---|---|---|---|---|---|
| Composition 4 | High MnO wool | 8.06 | 0.51 | 18.94 | 40.20 | 8.68 | 21.07 | 1.65 | 0.41 |
| Composition 5 | High MnO wool | 6.79 | 0.17 | 15.19 | 42.79 | 8.61 | 24.58 | 0.99 | 0.11 |
| Composition 3 | High MnO wool | 1.69 | 0.40 | 17.21 | 37.07 | 4.03 | 35.13 | 1.76 | 0.27 |
| Composition 6 | Low MnO wool, steel slag | 0.58 | 0.76 | 18.59 | 38.16 | 4.99 | 34.53 | 0.74 | 0.96 |
| Composition 7 | Low MnO wool, steel slag | 0.34 | 0.45 | 9.82 | 40.66 | 10.72 | 36.43 | 0.68 | 0.40 |

TABLE 4-continued

Compositions of example mineral fibers.

| Sample | General Classification | MnO | Fe2O₃T | Al₂O₃ | SiO₂ | MgO | CaO | K₂O | Na₂O |
|---|---|---|---|---|---|---|---|---|---|
| Composition 8 | Low MnO wool, rock/basalt wool | 0.31 | 6.92 | 17.80 | 42.62 | 8.42 | 19.37 | 0.98 | 1.94 |
| Composition 9 | Low MnO wool, steel slag | 0.31 | 0.65 | 10.98 | 40.64 | 10.48 | 34.27 | 1.06 | 1.05 |
| Composition 10 | Low MnO wool, rock/basalt wool | 0.13 | 4.55 | 14.96 | 44.17 | 14.25 | 20.08 | 0.28 | 1.64 |
| Composition 11 | Low MnO wool 6, rock/basalt wool) | 0.12 | 9.27 | 2.42 | 55.09 | 5.83 | 21.49 | 0.39 | 5.07 |

TABLE 5

Performance of example mineral fibers.

| Sample | Wt. % MnO | Wt. % Fe₂O₃T | Average Fiber diameter (microns) | Thermal conductivity (W/mK) | % Shrinkage at 750° C. | % Shrinkage at 850° C. |
|---|---|---|---|---|---|---|
| Composition 4 | 8.06 | 0.51 | 6.14 | 0.05 | −0.5 ± 0.4 | −3.9 ± 0.4 |
| Composition 5 | 6.79 | 0.17 | 7.40 | 0.05 | −0.2 ± 0.4 | −1.4 ± 0.4 |
| Composition 3 | 1.69 | 0.40 | 7.58 | NA | 0 ± 0.4 | −2.1 ± 0.4 |
| Composition 6 | 0.58 | 0.76 | 5.90 | NA | −1.5 ± 0.4 | −7.6 ± 0.4 |
| Composition 7 | 0.34 | 0.45 | 4.07 | 0.048 | −0.8 ± 0.4 | −8.8 ± 0.4 |
| Composition 8 | 0.31 | 6.92 | 5.59 | 0.033 | −0.9 ± 0.4 | −8.4 ± 0.4 |
| Composition 9 | 0.31 | 0.65 | 3.99 | NA | Not tested | −4.3 ± 0.4 |
| Composition 10 | 0.13 | 4.55 | 3.99 | 0.032 | −0.6 ± 0.4 | −7.5 ± 0.4 |
| Composition 11 | 0.34 | 9.27 | 6.06 | 0.05 | −1.0 ± 0.4 | −4.8 ± 0.4 |

Table 5 shows certain compositional attributes and the performance of mineral fibers having those attributes. A negative value for shrinkage means that shrinkage occurred under those conditions. For example, a −3.9 value corresponds to a shrinkage of 3.9%.

As shown in Table 5, wools with high MnO content were shown to have less shrinkage at high temperatures than wools made with low MnO content using standard steel and blast-furnace slags, as well as basalt, or rock-based wools. Low shrinkage is in turn associated with good performance in fire. A high iron oxide content is typically associated with providing superior fire performance; however, these data exemplify that high iron oxide content in and of itself does not provide superior resistance to shrinkage at high temperatures.

Table 5 further shows that surprisingly and unexpectedly, fiber diameter did not play a significant role in fiber shrinkage. Theoretically, as fiber diameter increases, one would expect shrinkage to decrease, as there is less surface area that is directly exposed to the heat. Table 5 further shows that surprisingly and unexpectedly, having lower conductivity did not correlate to less shrinkage. Theoretically, one would expect wools that have lower thermal conductivity, and therefore provide better insulating characteristics, to show less shrinkage at a given temperature.

In a fire situation, the ability of the wool to resist the tendency to shrink may allow the final manufactured good (a ceiling tile, wall or pipe insulation, etc.) to remain intact for a longer period of time, providing a continuous insulated surface that protects the building structure or infrastructure from the increasing temperatures. This, in turn, can provide additional time for buildings to be cleared, and for fire fighters to get the fire under control before structural damage begins.

While the present invention has been described with reference to several embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention is to be determined from the claims appended hereto. Further, it will be apparent to those of skill in the art that numerous changes may be made in such details without departing from the spirit and the principles of the invention.

What is claimed is:
1. A composition comprising:
   mineral fibers comprising:
      silicon dioxide;
      manganese oxide in an amount ranging from about 7.5 wt. % to about 9.5 wt. % based on the total weight of the mineral fibers;

aluminum oxide in an amount ranging from 17 wt. % to 21 wt. % based on the total weight of the mineral fibers;

iron oxide in an amount ranging from about 0.2 wt. % to 2.0 wt. %, based on the total weight of the mineral fibers;

CaO;

MgO;

$K_2O$; and $Na_2O$;

wherein the sum of (aluminum oxide+CaO+MgO+$K_2O$+$Na_2O$) within the mineral fibers is at least 50 wt. % based on the total weight of the mineral fibers; and wherein a ratio of (silicon dioxide+aluminum oxide)/manganese oxide within the mineral fibers is between 7 to 8.

2. The composition according to claim 1, wherein the aluminum oxide is present in an amount ranging from 18 wt. % to 20 wt. %, based on the total weight of the mineral fibers.

3. The composition according to claim 1, wherein the mineral fibers comprises silicon dioxide present in an amount ranging from about 35.0 wt. % to about 45.0 wt. %, based on the total weight of the mineral fibers.

4. The composition according to claim 1, wherein the mineral fibers comprises MgO present in an amount ranging from about 8 wt. % to about 9 wt. %, based on the total weight of the mineral fibers.

5. The composition according to claim 1, wherein the mineral fibers comprises $K_2O$ present in an amount ranging from about 1.0 wt. % to about 2.0 wt. %, based on the total weight of the mineral fibers.

6. The composition according to claim 1, wherein the mineral fibers comprises about 40 wt. % of silicon dioxide and about 18.9 wt. % of aluminum oxide.

7. The composition according to claim 6, wherein the mineral fibers further comprises about 8.65 wt. % of MgO.

8. The composition according to claim 1, wherein a ratio of (silicon dioxide+aluminum oxide)/(manganese oxide+iron oxide) within the mineral fibers is between 6 to 8.

9. The composition according to claim 1, a ratio of (silicon dioxide+manganese oxide)/(aluminum oxide+CaO+MgO+$K_2O$+$Na_2O$) within the mineral fibers is less than 1.

10. The composition according to claim 1, wherein the mineral fibers comprise fibers having a diameter of less than 3 microns and are more than 20 microns in length.

11. A composition comprising:
mineral fibers comprising:
silicon dioxide in an amount of about 40.0 wt. % of based on the total weight of the mineral fibers;
aluminum oxide in an amount ranging from about 18.0 wt. % to about 20.0 wt. % of based on the total weight of the mineral fibers;
manganese oxide in an amount ranging from about 8.0 wt. % to about 9.0 wt. % based on the total weight of the mineral fibers;
iron oxide in an amount between 0.2 wt. % to 1.0 wt. %, based on the total weight of the mineral fiber;
CaO;
MgO;
$K_2O$; and
$Na_2O$.

12. The composition according to claim 11, wherein a ratio of (silicon dioxide+manganese oxide)/(aluminum oxide+CaO+MgO+$K_2O$+$Na_2O$) within the mineral fibers is less than 1.

13. A composition comprising:
mineral fibers comprising;
silicon dioxide in an amount ranging from about 35 wt. % to about 45 wt. % based on the total weight of the mineral fibers;
aluminum oxide in an amount of about 18.9 wt. % based on the total weight of the mineral fibers;
manganese oxide;
iron oxide;
CaO;
MgO;
$K_2O$; and
$Na_2O$;
wherein a combined amount of (silicon dioxide+aluminum oxide)/manganese oxide ranges from about 7.1 to about 7.9.

14. The composition according to claim 13, wherein the MgO is present in an amount ranging from about 8 wt. % to about 9 wt. %, based on the total weight of the mineral fibers.

15. The composition according to claim 13, wherein the CaO is present in an amount ranging from about 18 wt. % to about 22 wt. %, based on the total weight of the mineral fibers.

16. The composition according to claim 13, wherein the $K_2O$ is present in an amount ranging from about 1.0 wt. % to about 2.0 wt. %, based on the total weight of the mineral fibers.

17. The composition according to claim 13, wherein the iron oxide is present in an amount between 0.2 wt. % to 1.0 wt. %, based on the total weight of the mineral fibers.

18. The composition according to claim 13, wherein the mineral fibers comprise fibers having a diameter of less than 3 microns and are more than 20 microns in length.

* * * * *